Aug. 5, 1969  D. J. COHEN ET AL  3,459,335
MANUAL DISPENSER FOR HEATED ADHESIVE
Filed March 3, 1967
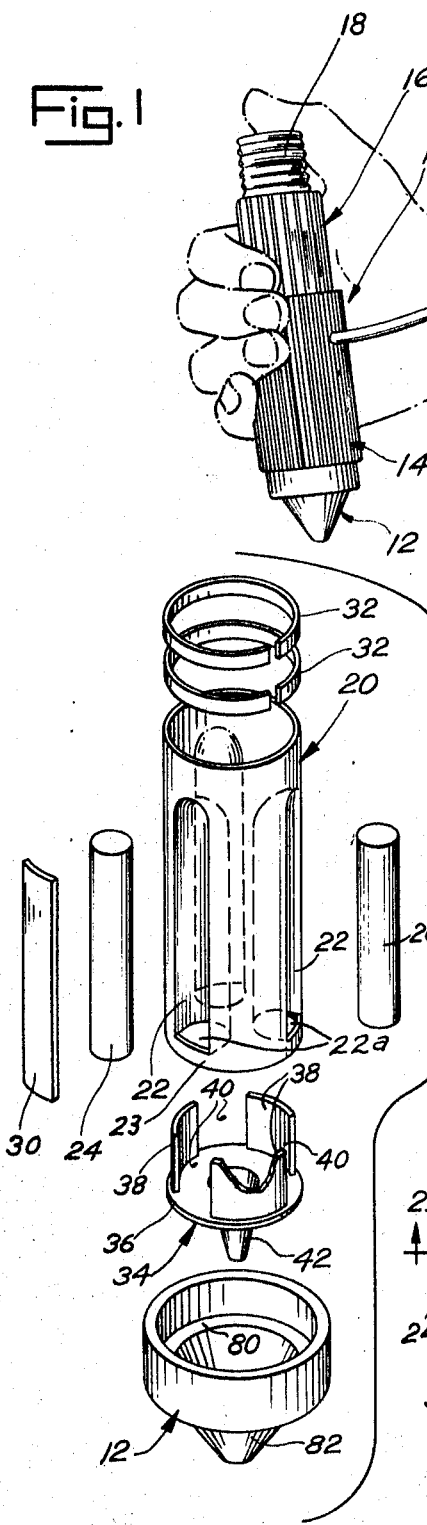
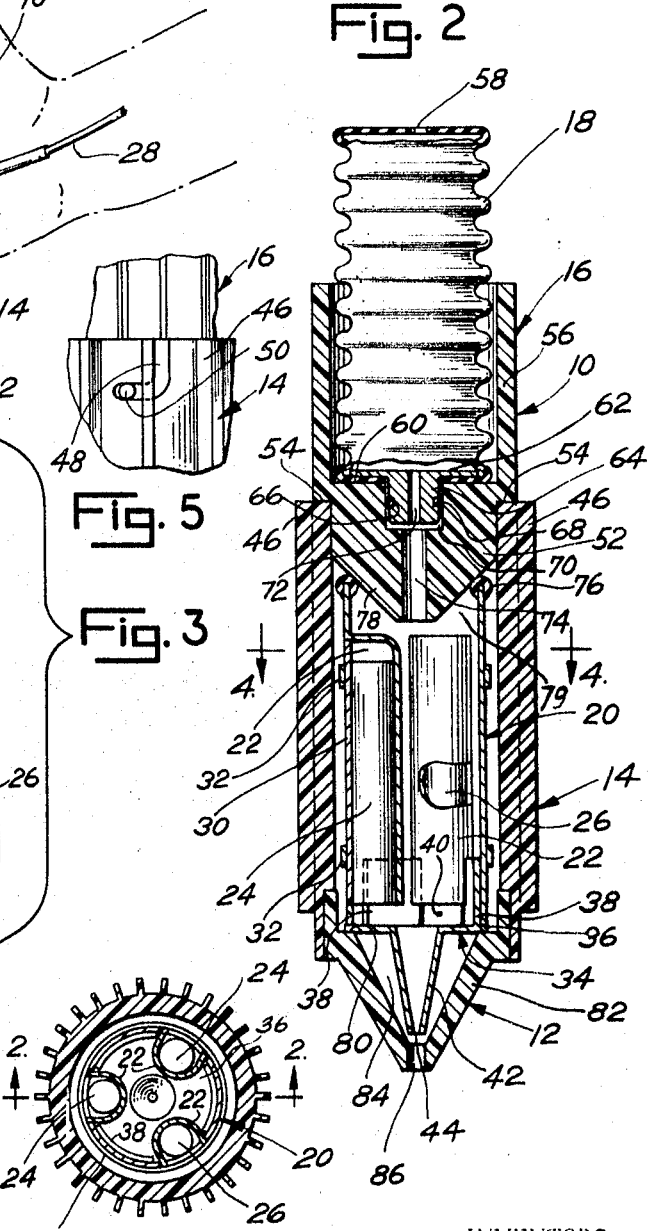
INVENTORS
DAVID J. COHEN &
SIDNEY L. BLIVICE
Bair, Freeman & Molinare
ATTORNEYS

United States Patent Office 3,459,335
Patented Aug. 5, 1969

3,459,335
MANUAL DISPENSER FOR HEATED ADHESIVE
David J. Cohen, 720 W. Gordon Terrace 60613, and Sidney L. Blivice, 1255 N. Sandburg Terrace 60610, both of Chicago, Ill.
Filed Mar. 3, 1967, Ser. No. 620,470
Int. Cl. B67d 5/62; B65d 35/28
U.S. Cl. 222—146                     10 Claims

ABSTRACT OF THE DISCLOSURE

An adhesive dispenser is provided having a melt chamber which is heated so that the adhesive or glue is placed in a flowable condition. Preferably the melt chamber is rigid or shape sustaining, and the melted adhesive bridges over the outlet from the chamber without flowing therefrom, and gas pressure is applied to one end of the melt chamber to cause the flowable adhesive to be dispensed through the outlet at the other end of the chamber.

BACKGROUND OF THE INVENTION

Field of the invention and description of the prior art

This invention relates to an improved adhesive dispenser, and it particularly relates to a dispenser which is useful for dispersing hot melt glue.

One of the best general purpose adhesives, such as glues or cements, is of the thermoplastic type. These thermoplastic adhesives have generally not been available for home use because the adhesive is normally available only in the form of solid blocks which must be heated to relatively high temperatures to be melted before they become flowable. These hot melt adhesives or glues have been used commercially only by using relatively expensive equipment for first melting and then dispensing the glue.

One type of adhesive dispenser which is designed to be manually operated and is used for dispensing a thermoplastic adhesive, and which may be used in the home, is shown in the Paulsen Patent No. 3,204,828. In this device, dispensing pressure is applied by the thumb to one end of a cement block while the other end of the cement block is being melted. This device is not considered to be satisfactory for a number of reasons. One reason is that only relatively small quantities of cement may be dispensed from the device since only relatively small amounts of the cement can be melted in a given time period. Also, if excessive pressure is applied to the solid end of the cement block, some liquid cement can be forced up, or retrovert, between the sleeve and the cement block which can ultimately cause the solid block of cement to become cemented into a fixed position. Furthermore, as the cement block moves downward into its guide sleeve, the portion of the block which cannot receive further pressure from the thumb because of its total entry into the guide sleeve either will have to be scrapped or a new cement block will have to be manipulated to force the remaining portion of the cement block into the lower heated portion of the guide sleeve.

It is therefore an important object of this invention to provide an improved manually operated adhesive or glue dispenser for thermoplastic adhesives which substantially avoids the disadvantages of prior art devices.

It is also an object of this invention to provide an adhesive dispenser for hot melt or thermoplastic adhesives which is particularly characterized by its simplicity and economy in construction, manufacture, and operation.

It is a further important object of this invention to provide an improved manually operated dispenser for thermoplastic adhesives wherein relatively large quantities of adhesive may be maintained in a fluid or flowable condition, so that relatively large quantities of adhesive may be dispensed, as desired, from the dispenser in a relatively short period of time.

It is still another object of this invention to provide an improved manually operated adhesive dispenser for thermoplastic adhesives wherein gas or air pressure is utilized at one end of a melt chamber for forcing the heated and flowable adhesive out from the other end of the chamber.

It is yet another object of this invention to provide an improved adhesive dispenser for thermoplastic adhesives wherein the operator's hand does not come into contact with the adhesive either in its solid condition or in its liquid condition during the dispensing operation.

Further purposes and objects of the invention will appear as this specification proceeds.

SUMMARY OF THE INVENTION

Brief description of the drawings

FIGURE 1 is a perspective view of one form of improved dispensing device for thermoplastic adhesives;

FIGURE 2 is an enlarged vertical cross-sectional view through the dispensing device of FIGURE 1, taken along the line 2—2 of FIGURE 4;

FIGURE 3 is an exploded perspective view of the melt chamber portion of the dispenser of FIGURES 1 and 2;

FIGURE 4 is a cross-sectional view of the dispenser taken along the line 4—4 of FIGURE 2; and FIGURE 5 is an enlarged detail view showing the connector for locking the air pressure supplying portion of the dispensing device to the outer shell of the dispenser.

DESCRIPTION OF THE PREFERRED EMBODIMENT

Referring to the drawings and particularly to FIGURE 1, the adhesive or glue dispenser, generally 10, is shown in an operating position in a person's hand. Externally, the dispenser 10 includes a heat insulating nozzle cover 12, a heat insulating casing 14 connected to the cover 12, a bellows support member 16 connected to the upper end of the casing 14, and a pressurizing bellows 18 carried within and by the support 16, and arranged for applying air pressure to the melted adhesive contained within the melt chamber of the dispenser 10.

The internal construction of the dispenser 10 is shown most clearly in FIGURES 2, 3 and 4. Within casing 14 is a hollow body or container 20 that is shape sustaining or rigid and is substantially cylindrical in shape and is open at both ends, as seen best in FIGURE 3. In order to provide for high heat conductivity, the body 20 is constructed of brass or copper. Three elongated depressions 22 are provided in the outer wall of the cylindrical body 20. Two of the depressions 22 receive therein resistors or heating elements 24 and the other depression receives therein a thermostat 26.

An electrical power cord 28 is brought into the dispenser 10 through an aperture in the side of casing 14. The power cord is connected to the resistors 24, which are connected in parallel, and the resistors are in series with the thermostat 26. After the heating resistors 24 are placed within the elongated pockets 22, they are covered by aluminum cover plates 30 that are arcuate in cross-section and which dissipate outwardly the heat radiating from the resistors 24. Each pocket 22 is open at its lower end and provides a space 22a. However, the lower end of body 20 defines a continuous peripheral strip 23. Metal clips 32 in the form of split rings are placed around the body 20 such as by a press fit to hold the cover plates 30 and resistors 24, as well as the thermostat 26, in position radially within the elongated pockets 22. Since the resistors 24 are in close spaced relation or direct contact with the walls of the pockets 22, heat is imparted from the container to the adhesive contained interiorly of body 20 so as to melt the adhesive to provide the adhesive in a fluid or flowable condition. The thermostat 26 controls the amount of heat imparted to the adhesive contained within the hollow container body 20 by the resistors 24. Preferably the adhesive is preformed into a body for entry into hollow body 20, such as in the form of a cylindrical slug ½″ diameter, by 1¾″ long. Alternatively, the adhesive may be in particle or chip form that has been broken or comminuted from a larger block of adhesive material.

The lower end of the hollow center of body 20 communicates with a hollow nozzle member 34. The nozzle member 34, formed of high heat conductive material, includes a horizontal or flat plate portion 36 which closes off the open bottom of the remainder of body 20, including spaces 22a, and has three spaced walls 38 of arcuate cross-section projecting upwardly therefrom to be located adjacent the inner surface of strip 23 in the spaces between each pair of pockets 22. Slots or recesses 40 defined between the edges of walls 38 receive the pockets 22 therebetween. An inwardly tapered frusto-conical hollow nozzle 42 having a restricted outlet 44 extends downwardly centrally from the plate portion 36. The nozzle 42 and its restricted outlet 44 are very important features of the dispenser 10, since the outlet 44 is small enough to prevent the adhesive or any chips or particles thereof from falling therethrough under force of gravity when the outlet 44 faces downwardly. In the example herein, the diameter of the outlet 44 is in the order of about .060 inch. The restricted outlet 44 serves a twofold function. First, the restriction 44 combines with the viscosity of the hot melt adhesive within body 20 and nozzle 42 to prevent undesired dripping of the adhesive from the dispenser 10 under ordinary atmospheric pressures. Secondly, when the adhesive is hot and flows, it bridges over the restricted outlet 44 so that when pressurized gas is applied, the pressurized gas cannot pass outwardly through the outlet 44 but instead causes the adhesive to flow through the outlet 44. It is of further importance that the upstanding walls 38 be in intimate contact with the lower end of the container 20 so that heat is transferred by conduction from the container 20 to the nozzle member 34. The mass of the nozzle member 34 is minimal so that its temperature will be substantially the same as the container 20 so that the adhesive being melted and passing through the nozzle 42 and the outlet 44 is maintained in a flowable condition at all times, during application of heat.

The outer casing 14 is of substantially cylindrical construction and is made of an insulating material, such as a suitable plastic. A plurality of radially extending elongated fins 46 are provided on the outer periphery of the casing 14 so as to provide both for a pleasing appearance as well as also assisting in dissipating heat which is imparted to the casing 14 from the heating elements 24.

The bellows support member 16 is securely connected to the upper end of the casing 14 by a pin and slot bayonet connection, such as shown in FIGURE 5. A pair of spaced L-shaped slots 48 are provided in the edge of the casing 14 at its upper end approximately 180° apart. A pair of similarly spaced pin members 50 extend radially outwardly from the bellows support member 16 and are placed into the L-shaped slots 48 for securing the support member 16 to the casing 14 by telescoping members 14 and 16 and then turning the members to cause the pins to enter the innermost ends of slots 48, as seen in FIGURE 5.

The bellows support member or upper housing 16, like the outer casing 14, is constructed of a suitable plastic insulating material to reduce the amount of heat which is imparted to the outer surface thereof, recognizing that the device 10 is to be manually held as in FIGURE 1. The upper housing 16 is of a substantially cylindrical construction and has a reduced diameter annular body portion 52 at its lower end which is received within the upper cylindrical end of the casing 14. Shoulders 54 are defined adjacent the upper end of the reduced diameter portion for abutting against the upper edge of the casing 14. The upper part of the housing 16, above portion 52, is hollow to define a relatively large cylindrical well 56 which receives thereinto a portion of the bellows 18.

The bellows 18 is desirably of rubber or flexible metal construction and includes a gas or air intake opening 58 at its upper end. The lower end of the bellows 18 includes a large central aperture 60 which receives a sealing plate 62. The sealing plate 62 includes a downwardly extending cylindrical stub portion 64 which extends completely through the aperture 60. The cylindrical stub portion 64 includes a groove 66 in its outer periphery for receiving an O-ring 68 therein. The O-ring 68 provides for sealing engagement between stub 64 and the wall of a cylindrical depression 70 defined in annular portion 52 below the well 56. The cylindrical stub portion 64 has a central passage 72 therethrough so that air can pass downwardly from bellows 18 through the air outlet passage 74 defined centrally of annular body portion 52 of the housing 16, so that air pressure may be applied to the liquefied adhesive contained within the container 20.

It will also be understood that bellows 18 and stub portion 64 may be formed of metal, with one or more O-rings 68 carried on stub 64 for entry into recess 70 to seal with the cylindrical wall of recess 70. The necessity of plate 62 is thereby avoided.

Since the air pressure which is developed by manual compression of the bellows 18 is to be applied to the hot liquid adhesive in the rigid-walled container 20, it is necessary to substantially avoid air leakage. The plate member 62 prevents loss of air pressure through the aperture 60 and between the outer surface of the bellows 18 and the inner surface of the well 56. Since air pressure is applied upon compression of the bellows 18, air pressure is applied against the plate 62 which has a relatively large surface area. As pressure is applied to the plate 62, it is pressed against the lower end of the flexible bellows 18 to effect a seal therebetween, thereby providing self-sealing between the plate 62 and the bellows 18 upon air pressure being developed within the bellows. The O-ring 68 provides added assurance for avoiding loss of air pressure between the outer surface of the bellows 18 and the inner surface of the well 56. Furthermore, the upper end of the rigid container 20 has a gasket 76, of a high temperature resistant rubber, bonded thereto. The rubber gasket 76 bears against the inwardly and downwardly tapered frusto-conical wall 78 at the lower end of the annular body portion 52. The gasket 76 thereby prevents air pressure loss between the glue container 20 and the bellows housing 16. By providing the described pressure seals, substantially all the air pressure developed in the flexible bellows 18 is applied to the upper portion of the melted adhesive contained within the body 20, so that the pressure is transmitted to the hot flowable adhesive forcing it to extrude through the restricted outlet 44 in the nozzle portion 42.

The lower end of the casing 14 has a nozzle cover 12 securely positioned thereon. Any desired means of securement may be used, including a bayonet type of connection such as shown in FIGURE 5. Also, a permanent bond may be provided between the nozzle cover 12 and the casing 14 since it is not necessary that the nozzle cover 12 be removable. The nozzle cover 12 may be defined with means thereon such as a peripheral internal shoulder for engaging the edge of plate 36 to aid in positioning the container 20 centrally of the casing 14 and in positioning the nozzle member 34 centrally of the cover 12. In the device shown, centering of the container 20 is effected at the upper end as hereinafter described. The tapered walls 82 of the nozzle cover 12 cooperate with the tapered nozzle portion 42 of the nozzle member 34 to define an air space 84 therebetween so that there is reduced heat transfer from the nozzle 42 to the cover 12. The nozzle cover 12 includes an opening 86 at its lower end in alignment with the restricted outlet 44 in the nozzle 42 to permit the passage of adhesive therethrough.

It will be seen that the inclined wall 78 of the frusto-conical shape at the lower end of annular body 52 co-operates with cylindrical body 20 and resilient gasket 76 to center body 20 within casing 14 to space the body 20 concentrically from the walls of casing 14 in heat-insulating relationship, while also effecting self-seating of the circular gasket 76 against conical wall 78. Similarly, the resiliency of the gasket 76 and the relatively thin wall of body 20 operate to receive and give slightly to accommodate and provide a pressure seal by body 52 pressed thereagainst under bias from the bayonet-type pin-and-slot lock 48–50, thereby providing a rigid assembly which also avoids leakage of gas past gasket 76.

A substantial axial length of annular body 52 enters into cylindrical body 20 and cooperates therewith to define annular recess or well 79 surrounding the lower end of body 52. In the device of FIGURE 1, this is a feature which prevents inadvertent flow of molten adhesive into the gas-pressurizing portion of the device because of the dispenser 10 is inadvertently inverted to some degree above horizontal, the well 79 will receive thereinto the molten adhesive and store same therein, thus inhibiting entry of molten adhesive through passageway 74 to the passageway 72 and/or bellows 18, where resolidification of adhesive and blocking of the gas passageway could occur.

Although the operation of the dispenser 10 should be readily apparent from the foregoing description, a brief description of the operation will be provided. A solid block of adhesive (not shown) shaped to be received within the rigid container 20, or chips or particles from a large block that has been comminuted, is inserted therein after the bellows housing 16 is separated from the casing 14 by rotation so that the pins 50 may be moved upwardly through the L-slots 48 in the casing 14. The housing 16 is then replaced on the casing 14 and is locked into position. The power cord 28 brings electricity to the resistors 24 until the thermostat 26 stops the flow of electricity when the desired temperature level has been reached in the adhesive container 20. The thermostat thereafter controls the flow of electricity to the resistors for controlling the temperature of the adhesive. The resistors 24 cause the pieces of adhesive to be heated, such as to about 300° F., and the thermoplastic adhesive melts so as to be flowable and in a molten viscous form.

As shown in FIGURE 1, the operator places a thumb over the air intake 58 at the upper end of the bellows. The bellows 18 is then compressed and air is forced manually by controlled compression of the bellows through the channel 72 and through the air outlet 74 into the interior of container 20. The gasket 76, O-ring 68, and plate member 62 substantially avoid loss of air pressure. Air pressure, which may be in the order of about two or three pounds per square inch, is thus applied to the flowable, molten, viscous adhesive within the container 20, which blocks outlet 44, and operates to force or extrude the adhesive outwardly through the restricted opening 44 in the nozzle portion 42 of the member 34 at a rate controlled by the viscosity of the adhesive and the pressure of the gas. Pressure is applied to the bellows 18 until it is no longer desired that adhesive is to be dispensed. When the air pressure is released, the viscosity of the adhesive, combined with the diameter of the opening 44, causes the adhesive to bridge across and block the restricted outlet 44 and prevents dripping of adhesive therefrom.

While the principles of this invention have been disclosed in the embodiment of a hand operated adhesive dispenser, it will be understood that the principles may also be used in industrial applications where hot melt type adhesives are to be used. Also, the container for hot melt adhesive may be arranged to have a fresh supply of adhesive fed thereto as needed without disassembly, as in a continuous process, and the pressurized gas or air may be supplied from a motorized source, or a source of pre-compressed gas such as a compressed-gas cylinder with an appropriate pressure regulator supplied for delivering pressure only at the proper level to effect extrusion of adhesive at the rate desired.

It will be understood that the melt chamber need not be of any particular shape and that the block of adhesive may be of any appropriate shape to be received into the melt chamber. Nor need all the adhesive within the melt chamber be liquefied at the same time, but that portion closest to nozzle 42 and orifice 44 must be liquefied, and if some adhesive remains solid it may provide an interface between the pressurized gas and the molten adhesive.

What we claim and desire to secure by Letters Patent is:

1. An adhesive dispenser comprising means defining an elongated melt and pressurizing chamber for receiving thereinto between its ends adhesive in solid form at room temperature, an outlet at one end of said chamber having an unobstructed opening of small size relative to the solid adhesive such that the solid adhesive will not fall therethrough by force of gravity when the outlet opening is directed downwardly, heating means in heat association with said chamber for heating the adhesive to cause it to change into a molten viscous form whose viscosity is such that the restricted outlet opening does not permit flow of molten adhesive therethrough under ordinary force of gravity, and manual generating means for selectively applying pressurized gas to the adhesive in the other end of said chamber when a portion of the adhesive therein is in viscous form and blocks the outlet opening so as to apply sufficient pressure to the molten adhesive to extrude the adhesive from the outlet opening at a rate controlled by the pressurized gas.

2. The device of claim 1 wherein said gas pressure applying means comprises a compressible bellows member having spaced inlet and outlet openings and the gas pressure is provided by pressurized air.

3. The device of claim 1 wherein said melt chamber and said heating means are surrounded by an outer elongated casing of insulating material adapted to be manually held, said outlet comprises a heat conductive material nozzle, a nozzle cover member of heat insulating material is secured to the other end of said casing, and a bellows support of insulating material is secured to the other end of said casing.

4. The device of claim 3 wherein said melt chamber is defined by a member of high heat conductive characteristics and which is formed to provide pockets in a wall thereof for receiving thereinto an electrical resistor element and a thermostatic control.

5. A dispenser as in claim 1 wherein the elongated melt and pressurizing chamber is defined by an elongated tubular body disposed coaxial of a casing adapted to be held in the hand, and with an insulating air space between the casing and tubular body, and means engaging the ends of the tubular body to hold the tubular body spaced from the casing.

6. A dispenser as in claim 5 including a frusto-conical part engaging the tubular body at one end, gas-seal means between the tubular body and frusto-conical part, and means for introducing pressurized gas through said frusto-conical part to the interior of the tubular body.

7. A dispenser as in claim 5 including a frusto-conical part engaging the tubular body at one end, gas-seal means between the tubular body and frusto-conical part, and means for introducing pressurized gas through said frusto-conical part to the interior of the tubular body, and means for applying a gas-sealing pressure axially between said frusto-conical part and said tubular body.

8. A manually actuated adhesive dispenser comprising, in combination, high heat conductive chamber means defining a melt and pressurizing chamber for receiving thereinto adhesive in solid form at room temperature, heating means for selectively heating the chamber means and the adhesive in the melt chamber to liquefy the adhesive, a discharge opening in said melt chamber through which adhesive may be extruded only when in liquefied form, an insulating casing means surrounding said melt chamber and heating means in spaced relation thereto for heat insulating the chamber means from the casing means, so that the casing means are adapted to be manually grasped to selectively manipulate the dispenser and its discharge opening to desired attitudes, and a manually operable generating and pressure-applying means heat insulated from the chamber means and detachably connected to said casing for selectively applying pressure to said liquefied adhesive to extrude same through said discharge opening.

9. A dispenser as in claim 8 including a part of said means that is detachably connected to said casing being positioned, when so connected, to engage the chamber means and to maintain said chamber means spaced from the casing means to provide a heat insulating space between the chamber means and the casing means.

10. A dispenser of adhesive in liquefied form comprising means defining a rigid pressurizing chamber for holding adhesive, at least a portion of which adhesive is in a viscous liquid form, an outlet from said chamber positioned to be covered by the viscous liquid in the chamber and defining an opening which by reason of its size effectively restricts the flow of viscous liquid therethrough under normal forces of gravity and atmospheric pressure due to the viscosity of said adhesive, and bellows means having spaced inlet and outlet openings for selectively introducing pressurized air into said chamber so as to apply sufficient pressure to the liquid adhesive to extrude it from the outlet opening at a rate controlled by the pressurized gas.

References Cited

UNITED STATES PATENTS

| | | | |
|---|---|---|---|
| 2,784,882 | 3/1957 | DuBois | 222—215 |
| 2,979,234 | 4/1961 | Kamborian. | |
| 3,054,535 | 9/1962 | Clarey | 222—215 |
| 2,567,960 | 9/1951 | Myers et al. | |

STANLEY H. TOLLBERG, Primary Examiner

U.S. Cl. X.R.

222—209